United States Patent
Tyree et al.

(10) Patent No.: US 8,845,770 B2
(45) Date of Patent: Sep. 30, 2014

(54) SYSTEM AND METHOD FOR SWITCHING FUEL FEEDS DURING GASIFIER START-UP

(75) Inventors: Ronald Frederick Tyree, Richmond, TX (US); Huan Van Ho, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 13/218,074

(22) Filed: Aug. 25, 2011

(65) Prior Publication Data

US 2013/0048085 A1 Feb. 28, 2013

(51) Int. Cl.
C10J 1/207 (2012.01)

(52) U.S. Cl.
USPC .......... 48/76; 48/61; 48/127.9; 48/127.1; 48/71; 48/72; 48/73; 48/200; 48/201; 48/202; 48/203; 48/69; 48/77; 48/78; 48/75; 48/63; 48/93; 48/94; 48/98; 48/99; 48/100; 48/214 R; 48/215

(58) Field of Classification Search
USPC .......... 48/61, 76, 127.9, 127.1, 67, 197 R
See application file for complete search history.

(56) References Cited

U.S. PATENT DOCUMENTS

| | | | |
|---|---|---|---|
| 3,210,181 A * | 10/1965 | Manny | 75/379 |
| 4,351,645 A * | 9/1982 | Marion et al. | 48/61 |
| 4,474,581 A | 10/1984 | Dille et al. | |
| 4,490,156 A | 12/1984 | Marion et al. | |
| 5,087,271 A | 2/1992 | Stellaccio et al. | |
| 5,513,583 A | 5/1996 | Battista | |
| 5,806,443 A | 9/1998 | Kobayashi et al. | |
| 6,033,447 A | 3/2000 | Moock et al. | |
| 7,229,483 B2 | 6/2007 | Lewis | |
| 2009/0107046 A1 | 4/2009 | Leininger et al. | |
| 2010/0219271 A1 | 9/2010 | Russell et al. | |
| 2012/0312889 A1 * | 12/2012 | Chandrashekar et al. | 239/5 |

FOREIGN PATENT DOCUMENTS

DE 102007034950 A1 1/2009

OTHER PUBLICATIONS

EPO Foreign Search Report dated Dec. 21, 2012 for related application 12181446.1-1270.

* cited by examiner

Primary Examiner — Kaity V. Handal
(74) Attorney, Agent, or Firm — Armstrong Teasdale LLP

(57) ABSTRACT

A gasification system including a gasifier, a feed injector, and a fuel feed system that includes a first feed line, a second feed line, and a controller that includes a processor. The processor is programmed to enable the first feed line to supply a fuel gas into the feed injector, enable the second feed line to supply oxygen into the feed injector, receive instructions to add a slurry to the gasifier, prevent the first feed line from supplying the fuel gas into the feed injector, enable the first feed line to supply the slurry into the feed injector, enable the second feed line to simultaneously supply the oxygen and the inert gas into the feed injector, and prevent the second feed line from supplying the inert gas into the feed injector.

12 Claims, 6 Drawing Sheets

Figure 4

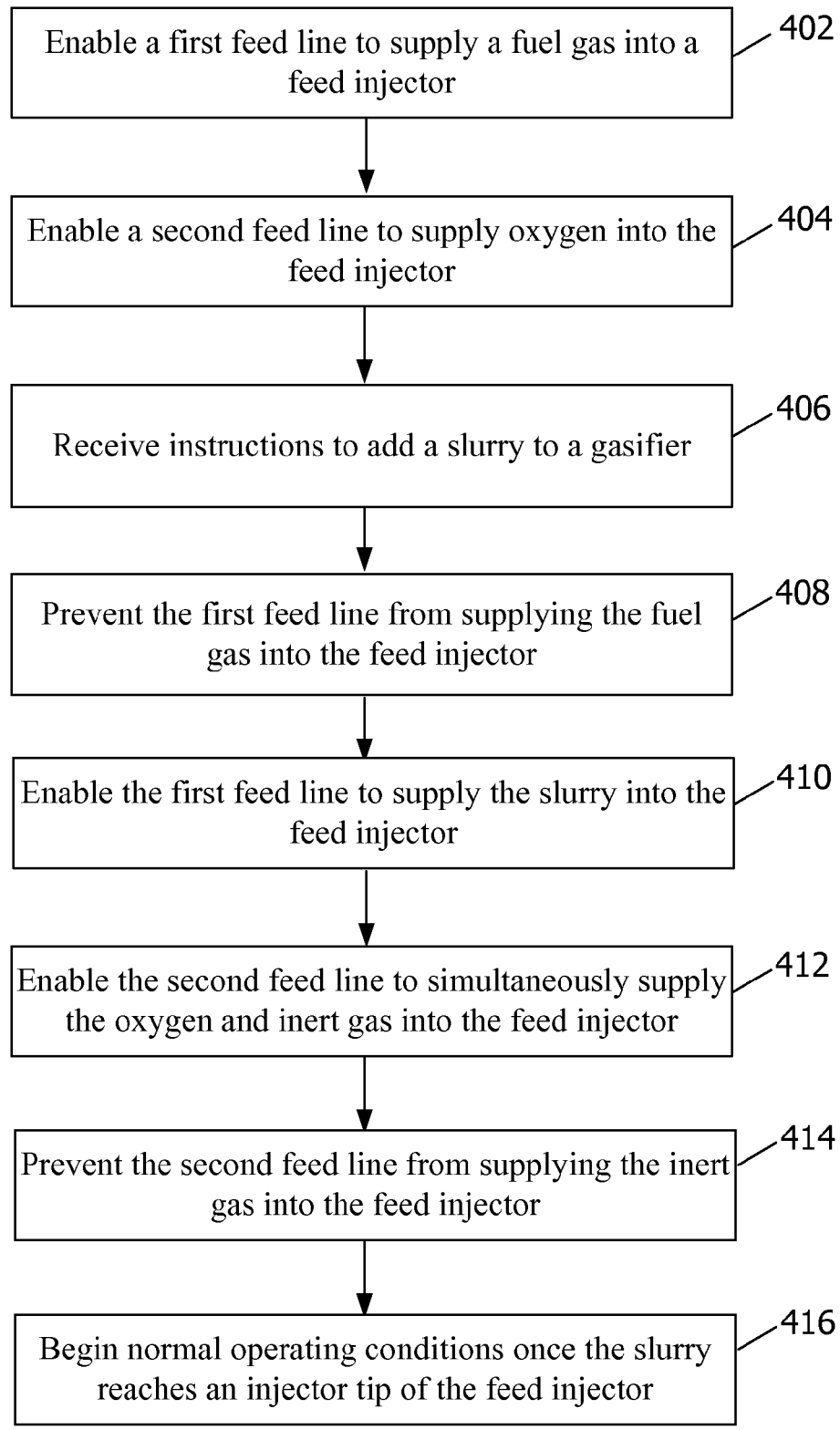

```
┌─────────────────────────────────────────────┐
│ Enable a first feed line to supply a fuel   │─── 402
│ gas into a feed injector                    │
└─────────────────────────────────────────────┘
                      ↓
┌─────────────────────────────────────────────┐
│ Enable a second feed line to supply oxygen  │─── 404
│ into the feed injector                      │
└─────────────────────────────────────────────┘
                      ↓
┌─────────────────────────────────────────────┐
│ Receive instructions to add a slurry to a   │─── 406
│ gasifier                                    │
└─────────────────────────────────────────────┘
                      ↓
┌─────────────────────────────────────────────┐
│ Prevent the first feed line from supplying  │─── 408
│ the fuel gas into the feed injector         │
└─────────────────────────────────────────────┘
                      ↓
┌─────────────────────────────────────────────┐
│ Enable the first feed line to supply the    │─── 410
│ slurry into the feed injector               │
└─────────────────────────────────────────────┘
                      ↓
┌─────────────────────────────────────────────┐
│ Enable the second feed line to              │─── 412
│ simultaneously supply the oxygen and inert  │
│ gas into the feed injector                  │
└─────────────────────────────────────────────┘
                      ↓
┌─────────────────────────────────────────────┐
│ Prevent the second feed line from supplying │─── 414
│ the inert gas into the feed injector        │
└─────────────────────────────────────────────┘
                      ↓
┌─────────────────────────────────────────────┐
│ Begin normal operating conditions once the  │─── 416
│ slurry reaches an injector tip of the feed  │
│ injector                                    │
└─────────────────────────────────────────────┘
``` us 8,845,770 B2

SYSTEM AND METHOD FOR SWITCHING FUEL FEEDS DURING GASIFIER START-UP

BACKGROUND OF THE INVENTION

The field of the disclosure relates generally to a gasifier, and more specifically to a system and method for switching fuel feeds during a gasifier start-up.

At least one known gasification system, such as an integrated gasification combined-cycle (IGCC) plant, includes a fuel supply system that is coupled upstream of a gasifier and that is configured to channel fuel to the gasifier. At least one known fuel is a slurry of powder coal and water. In such a system, the slurry is a viscous liquid that is metered within the fuel supply system and that is delivered at a predetermined pressure to the gasifier.

In some known IGCC systems with slurry fed gasifiers, a two-step process may be used for gasifier start-up that includes establishing steady flows of all feeds in bypass and/or start-up conduits not connected to the gasifier, and redirecting the flows into feed conduits connected to the gasifier feed injector according to a prescribed sequence. The start-up slurry flow in a slurry feed system is established in a circulation loop that returns to the original slurry storage tank, and the start-up oxygen flow may be vented to atmosphere through a silencer. In conventional systems, upon start-up, the slurry and oxygen flows are diverted into the gasifier so that the oxygen reaches the feed injector a short time after the slurry. The thermal energy stored in the preheated gasifier refractory brick ignites the reaction mixture and the gasification reactions begin.

BRIEF DESCRIPTION OF THE INVENTION

In one aspect, a gasification system is provided. The gasification system includes a gasifier, a feed injector coupled in flow communication with the gasifier, and a fuel feed system coupled in flow communication with the feed injector. The fuel feed system includes a first feed line for supplying a slurry or a fuel gas, a second feed line for supplying an inert gas and/or oxygen, and a fuel feed system controller that includes a processor. The processor is programmed to enable the first feed line to supply the fuel gas into the feed injector, enable the second feed line to supply the oxygen into the feed injector, receive instructions to add the slurry to the gasifier, prevent the first feed line from supplying the fuel gas into the feed injector, enable the first feed line to supply the slurry into the feed injector, enable the second feed line to simultaneously supply the oxygen and the inert gas into the feed injector, and prevent the second feed line from supplying the inert gas into the feed injector.

In another aspect, a gasification system is provided. The gasification system includes a gasifier, a feed injector coupled in flow communication with the gasifier, a fuel feed system coupled in flow communication with the feed injector. The fuel feed system includes a first feed line for supplying an inert gas and/or a fuel gas, a second feed line for supplying a slurry, a third feed line for supplying oxygen, and a fuel feed system controller that includes a processor. The processor is programmed to enable the first feed line to supply the fuel gas into the feed injector, enable the third feed line to supply the oxygen into the feed injector, receive instructions to supply the slurry to the gasifier, enable the second feed line to supply the slurry into the feed injector, prevent the first feed line from supplying the fuel gas into the feed injector, and enable the first feed line to supply the inert gas into the feed injector for a predefined period of time.

In yet another aspect, a method for switching fuel feeds to a gasifier is provided. The method includes supplying a fuel gas and oxygen into a feed injector coupled in flow communication with the gasifier, receiving instructions to supply a slurry to the gasifier, preventing the fuel gas from being supplied into the feed injector, and supplying the slurry into the feed injector.

BRIEF DESCRIPTION OF THE DRAWINGS

The present disclosure is described in detail below with reference to the attached drawing figures.

FIG. 4 is a process flow diagram of a fuel feed system, a feed injector, and a gasifier shown in FIG. 3.

DETAILED DESCRIPTION OF THE INVENTION

While embodiments of the disclosure are illustrated and described herein with reference to a dry feed gasifier that includes a single feed injector, aspects of the disclosure are operable with any system that performs the functionality illustrated and described herein, or its equivalent.

A dry feed gasifier that is fueled by a slurry, for example, a slurry of coal, a slurry of petroleum coke, or any combination thereof, may be started by feeding natural gas (e.g., fuel gas) and oxidant (e.g., oxygen) into a feed injector coupled to the gasifier. With a fuel gas as a starting fuel, a feed line that supplies the fuel gas to the gasifier can also be used to supply the slurry to the gasifier. For example, the feed line that supplies the fuel gas can be switched to supply the slurry to the gasifier. However, once the switch occurs, the slurry may need to travel several feet before the slurry reaches a tip of the feed injector. Thus, several seconds may pass before the slurry reaches the feed injector tip. During this time, oxygen is being fed to the gasifier with very little other fuel (e.g., pocketed fuel gas is being pushed along slowly by the incoming slurry). As a result, the gasifier can become oxygen rich which can lead to a detonation when the slurry finally reaches the injector tip of the feed injector. As such, a temperature of the gasifier can increase so much as to damage a refractory or other components of the gasifier, or oxygen may travel downstream of the gasifier and detonate at another location. To avoid these negative effects, an inert gas (e.g., nitrogen) can be introduced with the oxygen, reducing an effective oxygen flow rate to the gasifier, and when the slurry finally reaches the injector tip of the feed injector, the flow of the inert gas can be stopped, allowing normal operating conditions to begin.

In addition to the above, using a three stream feed injector that includes a plurality of flow passages keeps the slurry, when introduced into the feed injector, from cutting out a flow of the fuel gas or the inert gas for a number of seconds, during which the oxygen is continually being introduced into the feed injector. Supplying the fuel gas or the inert gas to the gasifier prior to the slurry being introduced into the gasifier helps to avoid a fuel rich condition and potential flame out because each of the fuel gas and the inert gas can reduce a level/purity of the oxygen being supplied to the gasifier. With a flame out, the gasifier must re-light, which introduces a potential for a pressure spike.

An exemplary technical effect of the methods and systems described herein includes at least one of (a) supplying a fuel gas and oxygen into a feed injector coupled in flow communication with a gasifier; (b) receiving instructions to supply a slurry to the gasifier; (c) preventing the fuel gas from being supplied into the feed injector; (d) and supplying the slurry into the feed injector.

Figure 1:
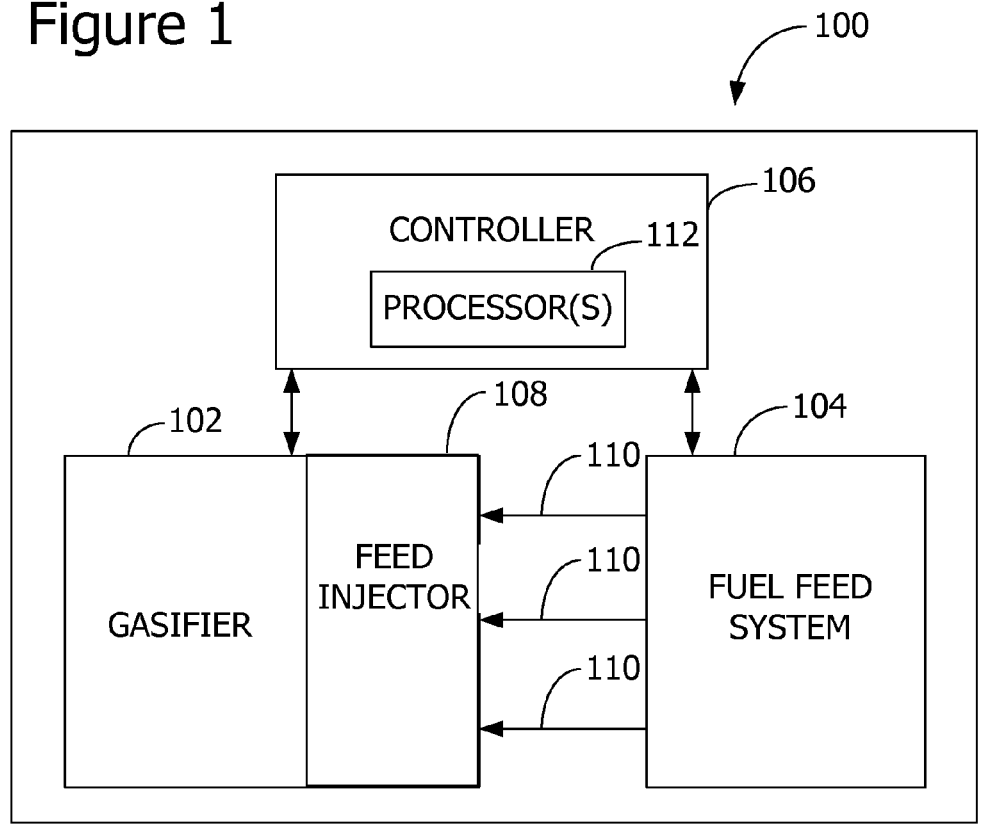
FIG. 1 is a block diagram of a portion of a gasification system.
Figure 2:
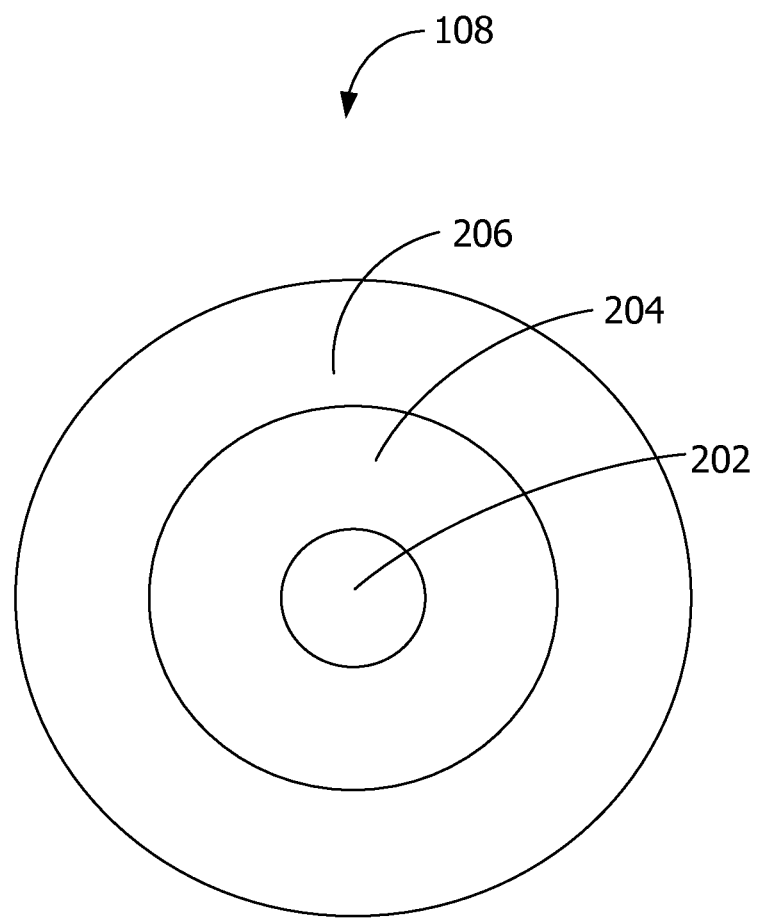
FIG. 2 is a cross-sectional view of a feed injector shown in FIGS. 3 and 5.

With reference to FIG. 1, a block diagram of a portion of a gasification system 100 is provided. Gasification system 100 includes a gasifier 102, a fuel feed system 104 coupled in flow communication with gasifier 102 (more specifically, a feed injector 108), and a fuel feed system controller (e.g., controller 106). Fuel feed system 104 may include a plurality of feed lines 110 supplying a slurry, a fuel gas, an inert gas, and oxygen to feed injector 108 coupled in flow communication with gasifier 102. In one embodiment, feed injector 108 includes a plurality of passages. For example, feed injector 108 may be a three stream feed injector that includes three flow passages as shown in FIG. 2, which is a horizontal cross sectional view of feed injector 108. As described in more detail below with respect to FIGS. 3 and 5, feed injector 108 includes a first passage 202, a second passage 204, and a third passage 206 for supplying the fuel gas, the inert gas, the slurry, and the oxygen to gasifier 102.

Referring back to FIG. 1, controller 106 includes at least one processor 112. In one embodiment, processor 112 is transformed into a special purpose microprocessor by executing computer-executable instructions or by otherwise being programmed. For example, processor 112 is programmed with instructions to implement a process as described in further detail below with reference to FIGS. 4 and 6.

Figure 3:
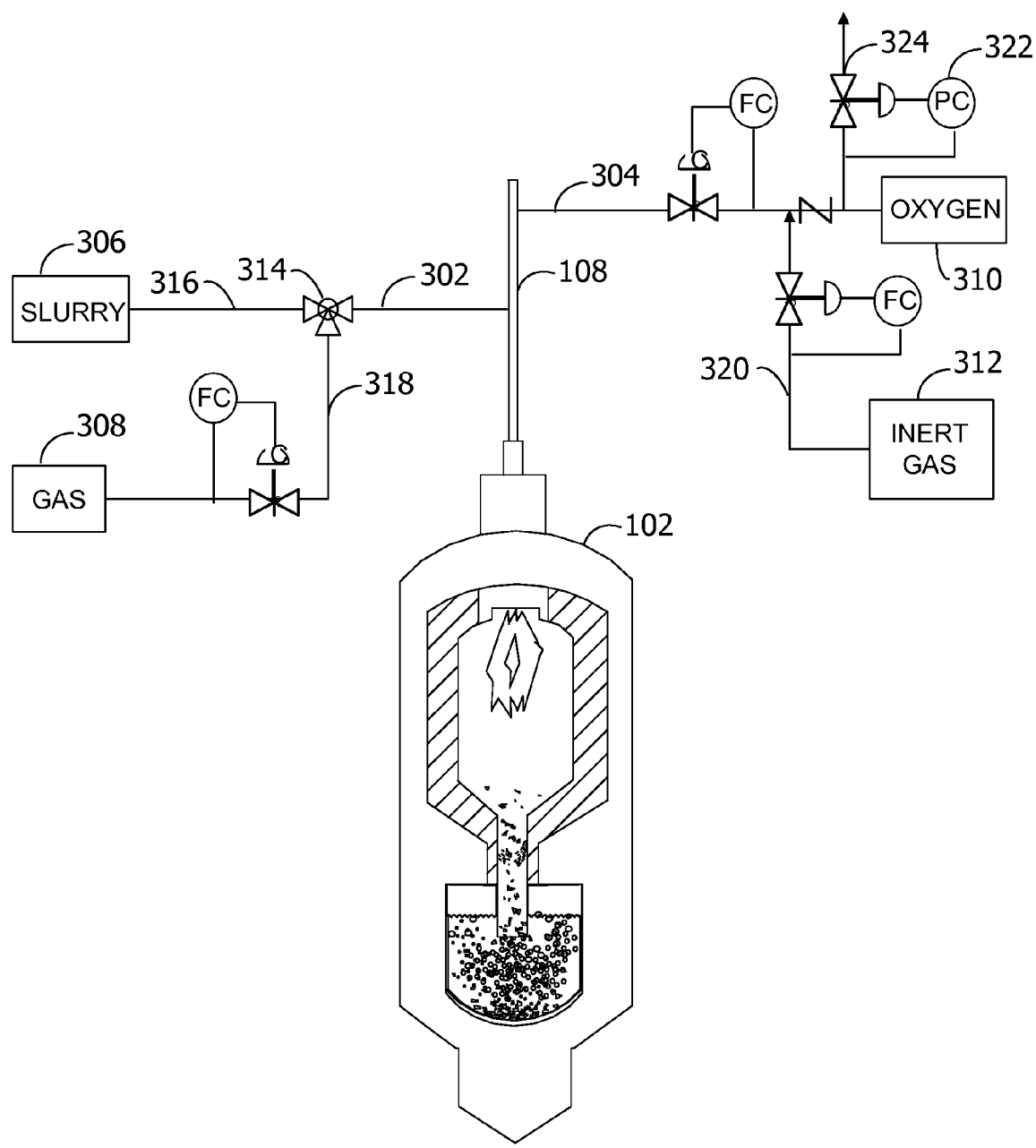
FIG. 3 is an illustrative example of the gasification system shown in FIG. 1.

FIG. 3 illustrates an embodiment of gasification system 100, and more specifically, an embodiment of fuel feed system 104 that includes a first feed line 302, a second feed line 304, a slurry supply line 316, a gas supply line 318, and an inert gas supply line 320 in flow communication with feed injector 108, for example, first passage 202, second passage 204, and third passage 206 of feed injector 108 shown in FIG. 2. In one embodiment, second feed line 304 is in flow communication with first passage 202 and third passage 206 of feed injector 108, and first feed line 302 is flow communication with second passage 204 of feed injector 108. Thus, a fuel gas is supplied from a gas supply 308 through gas supply line 318 and first feed line 302 to second passage 204 of feed injector 108. Oxygen is supplied from oxygen supply 310 through an oxygen supply line (e.g., second feed line 304) to first passage 202 and third passage 206 of feed injector 108. In one embodiment, slurry supply line 316, gas supply line 318, and first feed line 302 are coupled in flow communication via a three-way valve 314. Three-way valve 314 is configured to open or close a pathway of the slurry or the fuel gas based on, for example, instructions received from controller 106, and more specifically, processor 112 to supply the slurry from a slurry supply 306 through slurry supply line 316 and first feed line 302 to second passage 204 of feed injector 108. In one embodiment, until the slurry arrives at gasifier 102, a purity level of the oxygen being supplied to gasifier 102 is lowered by supplying the inert gas simultaneously with the oxygen through second feed line 304 to first passage 202 of feed injector 108. For example, the inert gas is supplied from inert gas supply 312 through inert gas supply line 320 coupled in flow communication with second feed line 304. In one embodiment, a pressure control 322 is communicatively coupled to second feed line 304 between oxygen supply 310 and feed injector 108. Pressure control 322 is configured to open an oxygen vent 324 to reduce an amount of the oxygen being supplied to feed injector 108 when a pressure in second feed line 304 that exceeds a threshold pressure is detected. Therefore, when the inert gas is simultaneously supplied with the oxygen through second feed line 304, the pressure in second feed line 304 rises, and once the pressure exceeds a threshold pressure, oxygen vent 324 opens to reduce an amount of the oxygen being supplied, thus lowering the pressure of in second feed line 304. Thereafter, when the slurry reaches the injector tip of feed injector 108, normal operating conditions begin and the oxygen is supplied to gasifier 102 through first passage 202 and third passage 206 of feed injector 108, and the slurry is supplied to gasifier 102 through second passage 204 of feed injector 108.

FIG. 4 is a process flow diagram of fuel feed system 104 supplying a slurry, a fuel gas, an inert gas, and oxygen to gasifier 102, shown in FIG. 3. At 402, first feed line 302 is enabled to supply the fuel gas into second passage 204 of feed injector 108. At 404, second feed line 304 is enabled to supply the oxygen into first passage 202 and third passage 206 of feed injector 108. At 406, instructions to add the slurry to gasifier 102 are received from, for example, controller 106, and more specifically, processor 112. At 408, first feed line 302 is prevented from supplying the fuel gas into second passage 204 by, for example, a pathway between gas supply line 318 and first feed line 302 being closed using three-way valve 314. At 410, the slurry is supplied to feed injector 108 by, for example, opening a pathway between slurry supply line 316 and first feed line 302 using three-way valve 314. In one embodiment, second feed line 304 is prevented from supplying the slurry to feed injector 108 if it is determined that a pressure of the slurry is below an operating pressure. Thereafter, second feed line 304 may be enabled to supply the slurry to feed injector once the slurry is at operating pressure. At 412, second feed line 304 is enabled to simultaneously supply the oxygen and the inert gas into first passage 202 of feed injector 108. At 414, second feed line 304 is prevented from supplying the inert gas to feed injector 108 by, for example, preventing inert gas supply line 320 from supplying the inert gas to second feed line 304. In one embodiment, the inert gas is supplied into first passage 202 for a predefined period of time. In another embodiment, the inert gas is supplied into first passage 202 until the slurry arrives at an injector tip of feed injector 108. At 416, once the slurry reaches the injector tip of feed injector 108, normal operating conditions ensue. For example, once the slurry reaches the injector tip of feed injector 108, the oxygen is supplied to gasifier 102 through first passage 202 and third passage 206 of feed injector 108, and the slurry is supplied to gasifier 102 through second passage 204 of feed injector 108.

Figure 5:
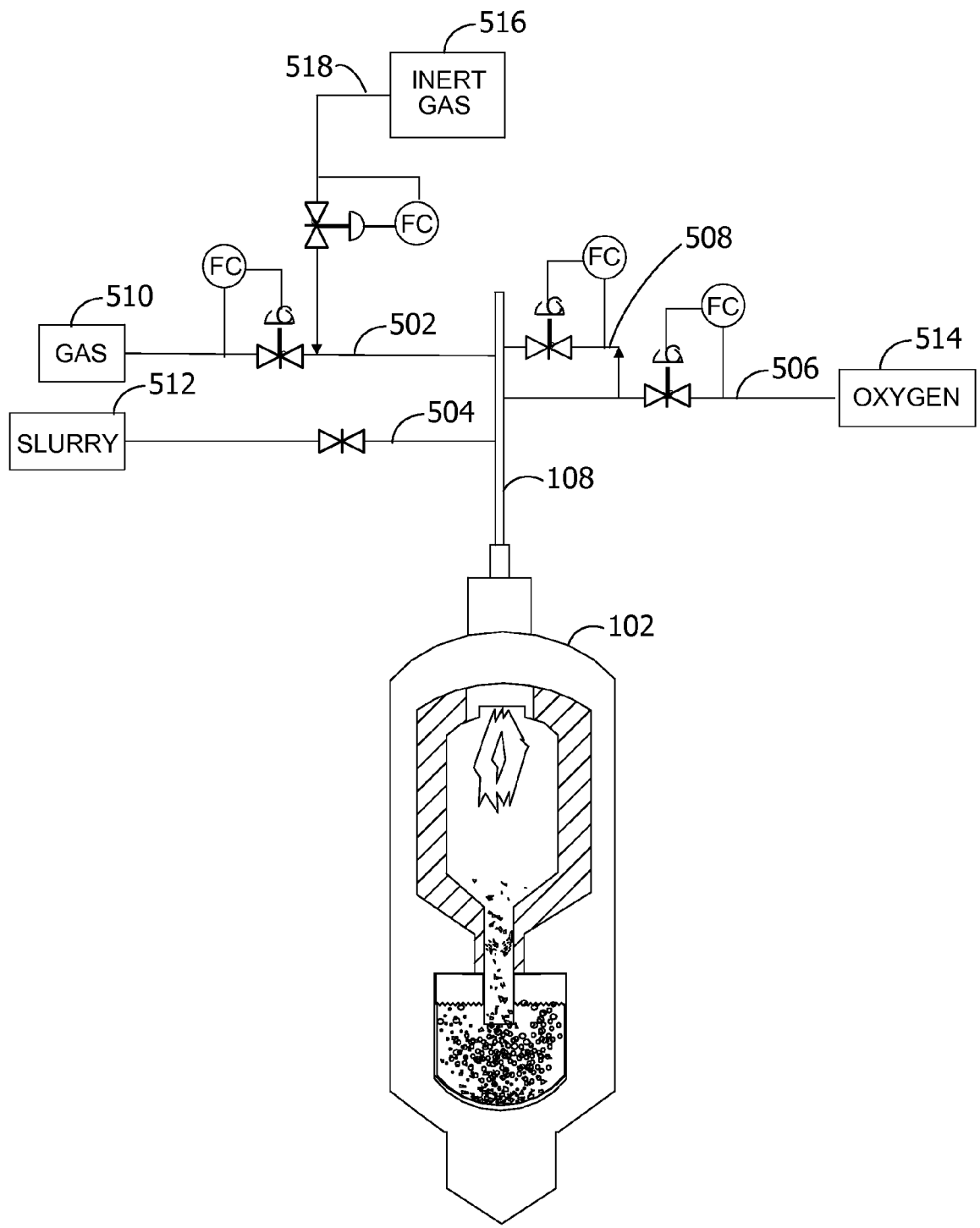
FIG. 5 is an illustrative example of the gasification system shown in FIG. 1.

FIG. 5 illustrates an embodiment of gasification system 100, and more specifically, an embodiment of fuel feed system 104 that includes a first feed line 502, a second feed line 504, a third feed line 506, a fourth feed line 508, and a fifth feed line 518 in flow communication with feed injector 108, shown in FIG. 2. During a start-up, a fuel gas is supplied from a gas supply 510 through a gas supply line (e.g., first feed line 502) to first passage 202 of feed injector 108, and oxygen is supplied from oxygen supply 514 through an oxygen supply line (e.g., third feed line 506) to third passage 206 of feed injector 108. However, when instructions are received from controller 106, and more specifically, processor 112, to supply the slurry from slurry supply 512 through second feed line 504 to second passage 204 of feed injector 108, fuel gas is prevented from being supplied to gasifier 102. Thereafter, to purge first feed line 502 and reduce a purity level of oxygen being supplied to gasifier 102, an inert gas is supplied from inert gas supply 516 through fifth feed line 518 in flow communication with first feed line 502. Once the slurry arrives at a tip of feed injector 108, the inert gas is prevented from being supplied to gasifier 102 and the oxygen is supplied from oxygen supply 514 through third feed line 506 and fourth feed line 508 to first passage 202 of feed injector 108. Thus, when the slurry reaches the injector tip of feed injector 108, normal operating conditions begin and the oxygen is supplied to gasifier 102 through first passage 202 and third passage 206 of feed injector 108, and the slurry is supplied to gasifier 102 through second passage 204 of feed injector 108.

Figure 6:
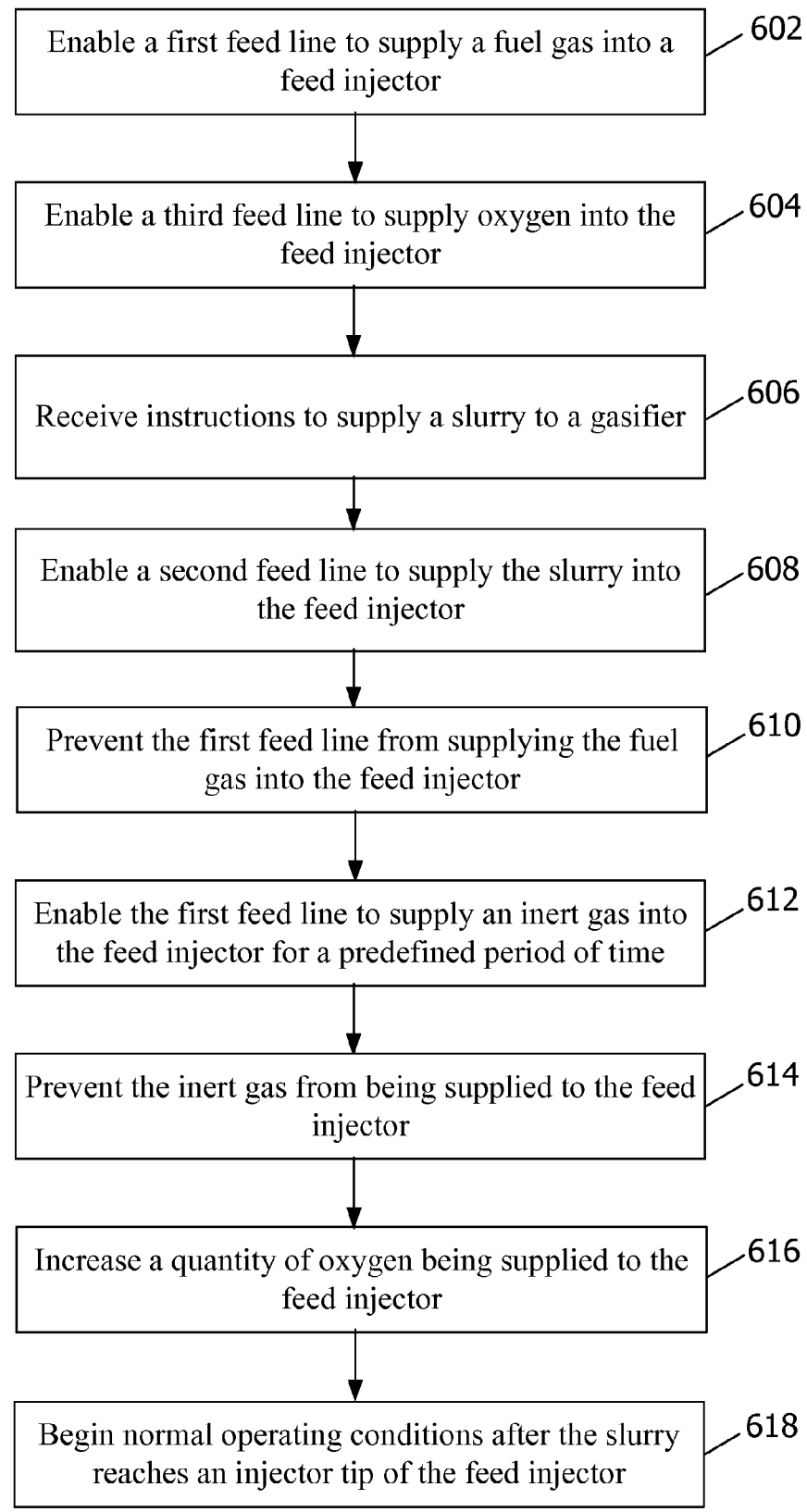
FIG. 6 is a process flow diagram of a fuel feed system, a feed injector, and a gasifier shown in FIG. 5.

FIG. 6 is a process flow diagram of fuel feed system 104 supplying a slurry, a fuel gas, an inert gas, and oxygen to gasifier 102, as shown in FIG. 5. At 602, first feed line 502 is enabled to supply the fuel gas to first passage 202 of feed injector 108. At 604, third feed line 506 is enabled to supply the oxygen to third passage 206 of feed injector 108. Thus, the fuel gas and the oxygen are simultaneously supplied to gasifier 102 through separate passages of feed injector 108. At 606, instructions to supply the slurry to gasifier 102 are received from, for example, controller 106 and more specifically, processor 112. At 608, second feed line 504 is enabled to supply the slurry into second passage 204 of feed injector 108. In one embodiment, second feed line 504 is prevented from supplying the slurry to feed injector 108 if it is determined that a pressure of the slurry is below an operating pressure. Thereafter, second feed line 504 may be enabled to supply the slurry to feed injector once the slurry is at operating pressure. At 610, first feed line 502 is prevented from supplying the fuel gas into first passage 202. At 612, to purge first feed line 502 and first passage 202, first feed line 502 is enabled to supply the inert gas into first passage 202 of feed injector 108 for a predefined period of time, for example, a predefined number of seconds it takes the slurry to arrive at the injector tip of feed injector 108. At 614, the inert gas is prevented from being supplied to first passage 202, and at 616, the oxygen is enabled to be supplied into first passage 202 via fourth feed line 508. At 618, once the slurry reaches the injector tip of feed injector 108, normal operating conditions ensue. For example, once the slurry reaches the injector tip of feed injector 108, the oxygen is supplied to gasifier 102 through first passage 202 and third passage 206 of feed injector 108, and the slurry is supplied to gasifier 102 through second passage 204 of feed injector 108.

The exemplary fuel feed system components illustrated are not limited to the specific embodiments described herein, but rather, components of each system may be utilized independently and separately from other components described herein. For example, the fuel system components described above may also be used in combination with different fuel system components.

Exemplary Operating Environment

A controller or computing device such as is described herein has one or more processors or processing units, system memory, and some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal, such as a carrier wave or other transport mechanism, and include any information delivery media. Combinations of any of the above are also included within the scope of computer readable media.

The controller/computer may operate in a networked environment using logical connections to one or more remote computers, such as a remote computer. Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the present disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices.

Aspects of the present disclosure transform a general-purpose computer into a special-purpose computing device when configured to execute the instructions described herein.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including,"

and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gasification system comprising:
a gasifier;
a feed injector coupled in flow communication with the gasifier; and
a fuel feed system coupled in flow communication with the feed injector, the fuel feed system comprising:
a first feed line for supplying a slurry or a fuel gas;
a second feed line for supplying an inert gas and/or oxygen; and
a fuel feed system controller comprising a processor, the processor programmed to:
enable the first feed line to supply the fuel gas into the feed injector;
enable the second feed line to supply the oxygen into the feed injector;
receive instructions to add the slurry to the gasifier;
prevent the first feed line from supplying the fuel gas into the feed injector;
enable the first feed line to supply the slurry into the feed injector;
enable the second feed line to simultaneously supply the oxygen and the inert gas into the feed injector in response to enabling the first feed line to supply the slurry, wherein the second feed line supplies the oxygen and the inert gas for at least one of a predefined period of time indicative of a time required for the slurry to reach the feed injector tip of the feed injector and until the slurry arrives at a feed injector tip of the feed injector; and
prevent the second feed line from supplying the inert gas into the feed injector.

2. A gasification system in accordance with claim 1, wherein the processor of the fuel feed system controller is further programmed to prevent the first feed line from supplying the slurry into the feed injector if a pressure of the slurry is below an operating pressure.

3. A gasification system in accordance with claim 1, wherein the inert gas is supplied simultaneously with the oxygen to lower a purity level of the oxygen until the slurry arrives at a tip of the single feed injector.

4. A gasification system in accordance with claim 1, wherein the feed injector is a three stream feed injector, the three stream injector comprising:
a first passage in flow communication with the second feed line;
a second passage in flow communication with the first feed line; and
a third passage in flow communication with the second feed line.

5. A gasification system in accordance with claim 1, wherein the fuel feed system further comprises:
a third feed line coupled in flow communication to the first feed line via a three-way valve, wherein the third feed line supplies the slurry from a slurry supply to the first feed line; and
a fourth feed line coupled in flow communication to the first feed line via the three way valve, wherein the fourth feed line supplies the fuel gas from a fuel gas supply to the first feed line.

6. A gasification system in accordance with claim 1, wherein the fuel feed system further comprises a pressure control communicatively coupled to the second feed line, the pressure control configured to open an oxygen vent to reduce an amount of oxygen being supplied to the single feed injector when a rise in pressure in the second feed line is detected.

7. A gasification system comprising:
a gasifier;
a feed injector coupled in flow communication with the gasifier; and
a fuel feed system coupled in flow communication with the feed injector, the fuel feed system comprising:
a first feed line for supplying an inert gas and/or a fuel gas;
a second feed line for supplying a slurry;
a third feed line for supplying oxygen; and
a fuel feed system controller comprising a processor, the processor programmed to:
enable the first feed line to supply the fuel gas into the feed injector;
enable the third feed line to supply the oxygen into the feed injector;
receive instructions to supply the slurry to the gasifier;
enable the second feed line to supply the slurry into the feed injector;
prevent the first feed line from supplying the fuel gas into the feed injector; and
enable the first feed line to supply the inert gas into the feed injector for a predefined period of time indicative of a time required for the slurry to reach the feed injector tip of the feed injector and until the slurry arrives at a feed injector tip of the feed injector; and
prevent the second feed line from supplying the inert gas into the feed injector.

8. A gasification system in accordance with claim 7, wherein the fuel feed system further comprises a fourth feed line in flow communication with the third feed line, the fourth feed line configured to supply oxygen from the third feed line to the fuel injector.

9. A gasification system in accordance with claim 8, wherein the feed injector is a three stream feed injector, the three stream injector comprising:
a first passage in flow communication with the first feed line and the fourth feed line;
a second passage in flow communication with the second feed line; and a third passage in flow communication with the third feed line.

10. A gasification system in accordance with claim 8, wherein the fuel feed system further comprises a fifth feed line coupled in flow communication to the first feed line, wherein the fifth feed line supplies the inert gas from an inert gas supply to the first feed line.

11. A gasification system in accordance with claim 10, wherein the inert gas is supplied to purge the first feed line and the first passage.

12. A gasification system in accordance with claim 7, wherein the processor of the fuel feed system controller is further programmed to prevent the second feed line from supplying the slurry into the feed injector if a pressure of the slurry is below an operating pressure.

* * * * *